United States Patent
Marzorati et al.

(10) Patent No.: US 11,523,200 B2
(45) Date of Patent: Dec. 6, 2022

(54) RESPIRATOR ACOUSTIC AMELIORATION

(71) Applicant: KYNDRYL, INC., New York, NY (US)

(72) Inventors: Mauro Marzorati, Lutz, FL (US); Sarbajit K. Rakshit, Kolkata (IN); Raghuram Srinivasan, Aurora, IL (US); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 131 days.

(21) Appl. No.: 17/208,079

(22) Filed: Mar. 22, 2021

(65) Prior Publication Data

US 2022/0303654 A1    Sep. 22, 2022

(51) Int. Cl.
    *H04R 1/08*   (2006.01)
    *G06N 20/00*  (2019.01)
    *H04R 1/40*   (2006.01)
    *G06F 1/16*   (2006.01)

(52) U.S. Cl.
    CPC ........... *H04R 1/083* (2013.01); *G06F 1/163* (2013.01); *G06N 20/00* (2019.01); *H04R 1/406* (2013.01)

(58) Field of Classification Search
    CPC ........ H04R 1/083; H04R 1/406; G06N 20/00; G06F 1/163
    USPC ................. 381/344, 150, 337, 339
    See application file for complete search history.

(56) References Cited

U.S. PATENT DOCUMENTS

| | | |
|---|---|---|
| 8,332,212 B2 | 12/2012 | Wittenstein et al. |
| 8,930,183 B2 | 1/2015 | Chun et al. |
| 10,728,941 B2 | 7/2020 | Batta et al. |
| 2014/0081631 A1 | 3/2014 | Zhu et al. |
| 2020/0120727 A1 | 4/2020 | Batta et al. |
| 2021/0158812 A1* | 5/2021 | Wooters ............... G10L 15/197 |

FOREIGN PATENT DOCUMENTS

| | | |
|---|---|---|
| IN | 202041049952 A | 11/2020 |
| JP | 4018571 B2 | 12/2007 |
| KR | 200314650 | 5/2003 |

OTHER PUBLICATIONS

E. Hunter, "Problems of diver communication," in IEEE Transactions on Audio and Electroacoustics, vol. 16, No. 1, pp. 118-120, Mar. 1968, doi: 10.1109/TAU.1968.1161958.

(Continued)

*Primary Examiner* — Thjuan K Addy
(74) *Attorney, Agent, or Firm* — John Kennel; Andrew M. Calderon; Calderon Safran & Cole P.C.

(57) ABSTRACT

An acoustic signal is received from a first user. The acoustic signal of the first user includes a verbal utterance related to the first user. A set of one or more non-verbal sensor readings may be detected from a set of one or more sensors of a wearable device. The wearable device is worn by the user concurrent with the verbal utterance. A verbal distortion factor may be determined based on an acoustic adjustment model and in response to the set of non-verbal sensor readings. An adjusted verbal utterance related to the first user may be generated. The adjusted verbal utterance may be generated from the verbal utterance and based on the verbal distortion factor. The adjusted verbal utterance may be provided to a voice output.

20 Claims, 4 Drawing Sheets

(56) References Cited

OTHER PUBLICATIONS

Gerritsen, T.A. et al., A source impedance compensated artificial voice for mask speech intelligibility testing: Thevenin model, The Journal of the Acoustical Society of America 100, 3408 (1996).

* cited by examiner

RESPIRATOR ACOUSTIC AMELIORATION

BACKGROUND

The present disclosure relates to respirators, and more specifically, to adjusting verbal acoustic information to reduce distortion.

Respirators may be used for a variety of reasons, such as working or traveling. A respirator may prevent the influx of particulates in an atmosphere that is in the vicinity of a user. A respirator may also inhibit or distort a voice of the user that wears the respirator.

SUMMARY

According to embodiments, disclosed are a method, system, and computer program product.

An acoustic signal is received from a first user. The acoustic signal of the first user includes a verbal utterance related to the first user. A set of one or more non-verbal sensor readings may be detected from a set of one or more sensors of a wearable device. The wearable device is worn by the user concurrent with the verbal utterance. A verbal distortion factor may be determined based on an acoustic adjustment model and in response to the set of non-verbal sensor readings. An adjusted verbal utterance related to the first user may be generated. The adjusted verbal utterance may be generated from the verbal utterance and based on the verbal distortion factor. The adjusted verbal utterance may be provided to a voice output.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
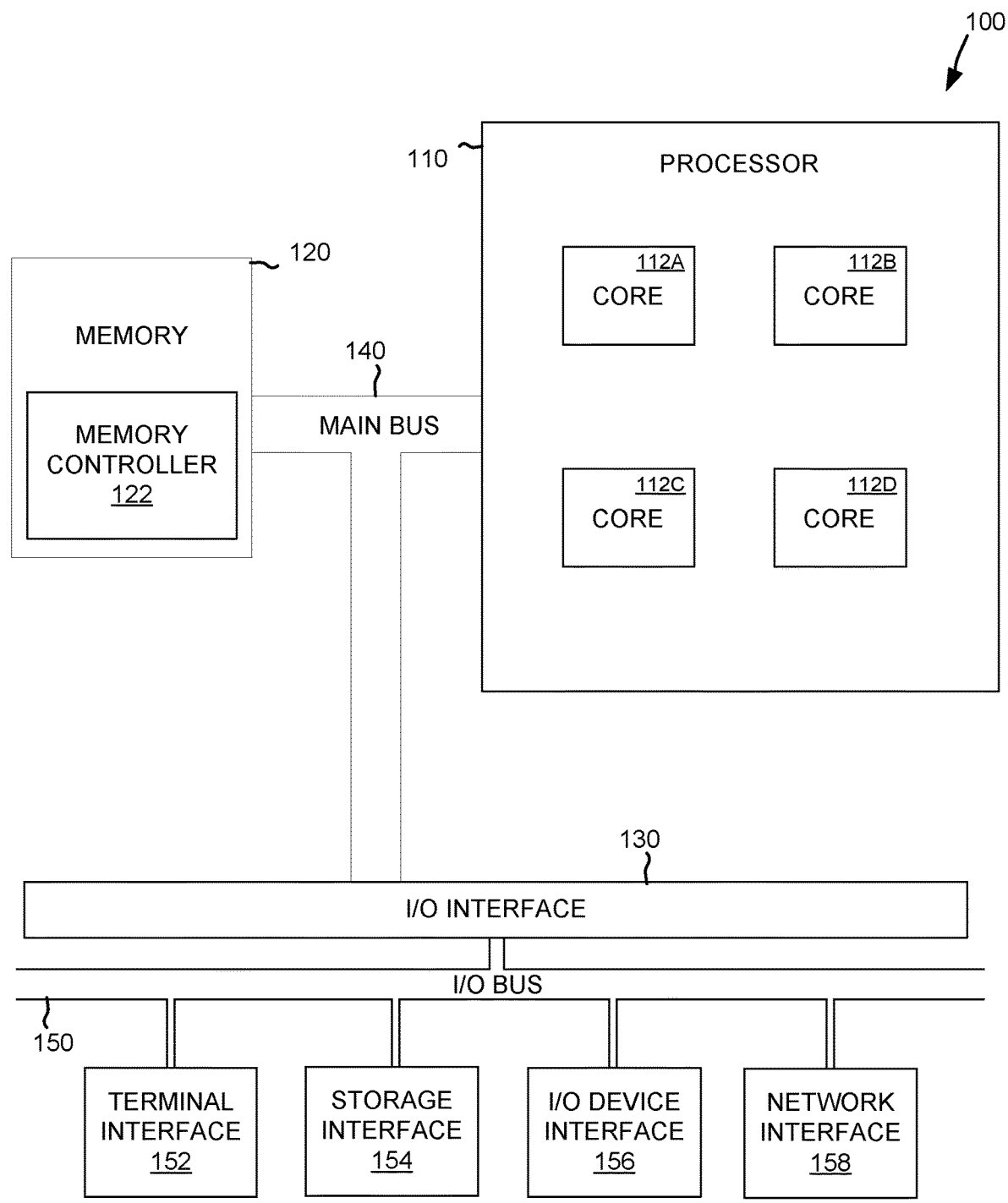
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to respirators—more particular aspects relate to adjusting verbal acoustic information to reduce distortion. While the present disclosure is not necessarily limited to such applications, various aspects of the disclosure may be appreciated through a discussion of various examples using this context.

Respirators may provide protection and help prevent a user from certain hazardous conditions. A respirator (alternatively, mask or face mask) may be a device designed to protect a user from inhaling hazardous atmospheres, including fumes, vapors, gases, or any other matter (e.g., dust, airborne microorganisms, hazardous particulates). A respirator may be an air-purifying or air-supplying configuration. An air-purifying respirator may filter an atmosphere. An air-supplying respirator may include an alternate supply of air, and the user may breathe the alternate supply of air instead of the atmosphere in the surrounding environment.

In some situations, a user may decide to wear a respirator when navigating a particular environment. For example, a person may decide to wear a respirator to comply with a local regulation or ordinance. In another example, a person may have to, for employment, travel to or through an area that is polluted. Increasingly, it may be a health-conscious decision that a user may make to wear a respirator. For example, a user may be infected with a disease, and the user may decide to wear the respirator to prevent the spread of the disease. In another example, a user may decide to wear a respirator to prevent being infected with a disease from another user.

In many situations, the usage of a respirator by a user may happen while interacting with other users. For instance, a user may be in a public store to purchase supplies, groceries, or other products. The user may at the same time be wearing a respirator to not spread an illness. In another situation, a user may be using public transportation and the user may want to wear a mask to deal with odors or harmful atmospheres. In these situations, a user may wish to communicate with others, such as by talking or by making a telephone call.

Issues may exist, however, with respirators in the inability to clearly verbalize (e.g., speak). Specifically, one issue relates to spoken and verbal communication. Verbal communication may be imperative and foundational for users and may be a necessary way to clearly communicate. Specifically, various verbal and non-verbal acoustic signals in speech may be used to convey meaning and for the following: informing, declaring, asking, persuading, directing, and can use enunciation, intonation, degrees of loudness, tempo, and the like. Another issue may be the psychological well-being of a user. Specifically, a user may prefer to talk or verbalize a situation they are experiencing. For instance, a user may be stressed about a situation they are experiencing in their professional life, and the user may be verbalizing to themselves in order to process the stressful situation. Yet another issue is in communication with voice-based computer interfaces. For instance, a voice-based assistant may be a computer system that receives as input verbal communication from a user. The voice-based assistant may be configured to perform various tasks or operations. The voice-based assistant may execute as part of a laptop personal computer, smartphone or a dedicated hardware voice-based assistant to perform tasks such as settings timers, providing weather information, turning on connected appliances and other tasks. The voice-based assistant may only operate if a user is able to provide clear speech for others.

In these various situations, when wearing a respirator and as users speak, various parts of their body may be obstructed, muffled, or otherwise compromised due to the respirator. For example, as users speak, they modulate sounds with their tongue as well as their lips and other parts of their mouth. The tongue may touch a specific portion of the mouth, or may be positioned or placed in a certain portion or orientation in the mouth, to generate different verbal communication (e.g., speaking). In another example, as users speak, they move their lips to direct air and emphasize certain vibrations, reverberations, and air movements that make up the different sounds. Further, certain sounds may only be accurately produced by the proper direction of air through the mouth, through the proper vibration of vocal chords, mouth, or other part of the body. The respirator may be necessary in certain environments, but it may make it impossible to communicate or accurate speak due to pressing on the face, obstructing air flow, altering vibrations and other issues.

Respirator Acoustic Amelioration (RAA) may provide a solution to the obstructed, muffled, compromised, and distorted verbal acoustics of a person wearing a respirator. RAA may operate by a respirator with enhanced sensors, that are configured to measure and provide readings of various parts of user while wearing the respirator. The RAA may be configured to provide clarity to a user's voice while speaking and wearing a respirator.

The respirator of the RAA may be a wearable device that is paired with a mobile device (e.g., smartphone, smartwatch, tablet) of the user. The respirator may have a microphone configured to capture the sound generated while the user speaks. The respirator may also have one or more air flow measurement sensors, like air flow coming out from mouth, speed of air counts out from mouth, direction of airflow coming out from mouth. The respirator may also have one or more vibration measurement sensors, and the same will be captured from the surface of the respirator. In some embodiments, the RAA may operate on a throat microphone that may be configured to provide one or more vibrations or other acoustic input.

The RAA may also be configured to determine a verbal distortion factor. Specifically, the RAA may operate in a learning process, and during the learning process the respirator may capture the sound created with a masked face (e.g., wearing the respirator). The sensors and the microphone may capture various readings from the user. The RAA may be configured to identify spoken content of the user. The identification may be based on a determining a verbal distortion factor of the user. For example, the RAA may learn or model specific types of distortions in the speech while wearing respirator. The RAA may compare the distortions to spoken content made without wearing a respirator, such as prerecorded speech of the user while the user does not wear the respirator or prerecorded speech of other users who are not wearing a respirator. The RAA may also create a personalized knowledge corpus on how the user speaks with respirator. The knowledge corpus may contain information on how the user speaks and what particular distortions that specific user makes while wearing the respirator (e.g., various sounds, air flow measurements, tones, distortions, and other acoustic values of the user while wearing the respirator).

The RAA may use a verbal distortion factor to correct speech of the user. Specifically, the verbal distortion factor may be determined based on the sensor readings and microphone that records the verbal utterances of the user. The sensor readings may include non-verbal sensor readings such as air movement and vibrations and the verbal utterances may be the distorted speech. The verbal utterances and the non-verbal sensor readings may be used to determine a verbal distortion factor. This verbal distortion factor may be used to perform a correction of the verbal utterances of the user. The verbal distortion factor may be a value that represents a decibel offset, distortion value, volume adjustment, or other value that may be applied to the captured verbal utterances. The verbal distortion factor and the verbal utterance may be used to generate an adjusted verbal utterance. The adjusted verbal utterance may sound like the voice of the user without wearing the mask, despite the user currently wearing the mask.

The RAA may leverage processing power of another electronic device, such as processing power located in a smartphone or tablet. In usage, when a use wants to have a phone call, the RAA may execute on the user's phone to alleviate any distortion due to wearing the respirator. In another usage scenario when a user wants to listen to their own voice, the user may wear headphones and hear an undistorted version of their own voice. In another usage scenario, the user may be wearing the respirator of the RAA and speak. The distorted and muffled voice of the user may be transmitted to a tablet of the user and the tablet may perform RAA to correct and ameliorate the user's voice distortion. A modified version of the verbal acoustics may be the voice of the user with the verbal distortion factor applied to recreate an artificial (e.g., machine generated) version of the user's voice that may be played aloud by the tablet. The tablet may then take a distorted version of the user's voice to produce a machine-created undistorted version of the user's voice for commanding a voice-based computer interface. In yet another usage scenario, a user can also use hear an undistorted machine-generated version of the user's voice through a speaker of the mobile phone executing RAA.

The RAA may function to facilitate clear communication with another user. Specifically, a first user may make a phone call, and the mobile device of the first user may be executing RAA to correct the spoken content from the first user. The corrected spoken content may be generated in real-time during the phone call and the corrected version (e.g., the machine-generated version of the voice of the first user) may be transported by a telephonic network to a second user (e.g., a receiving party of the phone call). The second user may receive the adjusted verbal utterance without being able to determine that the first user is speaking while wearing a respirator. Stated another way, the other user may not be able to distinguish between the adjusted verbal utterance generated by the phone that executes RAA and the voice and speech of the first user without wearing the mask.

The RAA may also function to identify various non-verbal cues or information within verbal utterances of a user wearing a respirator. Specifically, the RAA may be executing analysis and learning on the speech to identify various non-verbal acoustics and other queues. For example, the RAA may identify as part of determining a verbal distortion factor, one or more of the following: tones, speech patterns, rates of speed, volume changes, variations in pitches, and other characteristics of the user. In another example, a type of speech may be identified based on analysis by the RAA, such as that a user is whispering, yelling, speaking up, speaking quietly, speaking excitedly, and the like.

The RAA may recreate the characteristics of the speech of a user based on the determined verbal distortion factor. In detail, as part of generating an adjusted verbal utterance of the user, the dynamics and changes of a person's speech, along with other factors that may be muted, muffled, or otherwise eliminated by wearing a mask may be identified. The variations and changes of speech may be incorporated as part of the determined verbal distortion factor. For example, if a user is speaking loudly, the sensor readings from the volume and vibration sensors may be recorded, and these sensors readings may be used to generate a verbal distortion factor that contains an increased volume and/or vibration amount. The verbal distortion factor containing information of a user speaking loudly may then be applied to the microphone that records the verbal utterances of the user. When the RAA processes the speech to generate the adjusted verbal utterance, the verbal distortion factor will recreate a loudly spoken machine-generated speech. This speech may then maintain the specific particulars, such as emotion, urgency, privacy, and other non-verbal intonations of a user's speech. This results in a mobile device that executes RAA, adjusting, in real time, the spoken loudness and tone of a user. Accordingly, the listening party will be able to hear with a proper level of loudness.

In some embodiments, the RAA may be configured to dynamically adjust the security of verbal utterances based on analysis and determination of a verbal distortion factor. Specifically, the user can define different levels of a security profile in the spoken conversation, and accordingly the proposed system will be implementing appropriate level of permission to a receiving party. The user may use an interface of an electronic device (e.g., a touchscreen of a smartphone) that executes RAA to indicate various security levels. A user may assign speech that matches whispering to a first security level of private non-shared speech, speech that matches normal speaking to a second security level of limited shared speech, and loud speaking to a third security level of fully shared speech. In an implementation, the RAA executing on an electronic device may adjust the sharing or access of speech of the user wearing a respirator based on determining a type of speech and matching that type of speech to a set security level. For example, while using the RAA, and speaking into the respirator, the RAA may determine that a user is speaking with a normal voice to a particular output, such as a text-to-speech application that converts text to messages of other users. Based on determining that the respirator-wearing user is speaking normal, the RAA may present to the text-to-speech application the normal speech. During speaking, the user may wish to say some things out loud that the user does not wish to be recorded. The user may speak by whispering and the RAA may determine that the speech matches a whisper; responsively the RAA may prevent or block the speech from being provided to the text-to-speech application.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100— including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
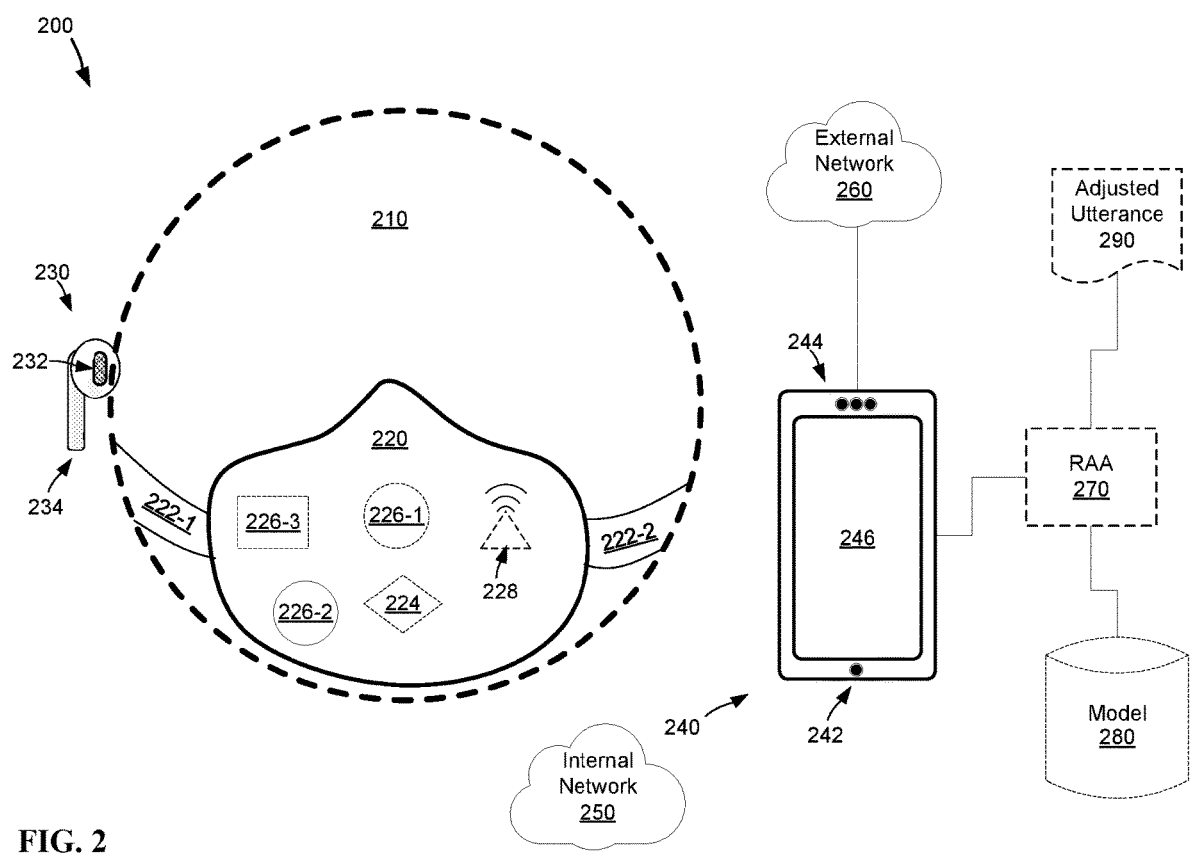
FIG. 2 depicts an example system for performing adjustments to verbal utterances in accordance with some embodiments of the present disclosure.

FIG. 2 depicts an example system 200 for performing adjustments to verbal utterances in accordance with some embodiments of the present disclosure. System 200 may operate on the utterances or other acoustic information of a user 210 and be configured to perform RAA. User 210 may be depicted in FIG. 2 by dashed lines that represent a head of the user 210. System 200 may comprise one or more of the following: a respirator 220, a headphone 230, an electronic device 240, an internal network 250, and an external network 260.

The respirator 220 may be worn by the user 210 and configured to provide air that is breathable by the user 210. Respirator 220 may be configured as an air-purifying respirator. For example, respirator 220 may be configured with a particulate filtration material such as paper, cloth, or other relevant material. In some embodiments, respirator 220 may include multiple particulate filtrations materials, such as a first paper layer, and a second cloth layer. Respirator 220 may be configured as an air-supplying respirator. For example, respirator 220 may also include an independent air supply (not depicted) configured to provide atmospheres of breathable air to user 210. Respirator 220 may also include straps 222-1 and 222-2 (collectively, 222) configured for attachment of the respirator 220 to user 210. When worn, respirator 220 may be affixed or otherwise attached to the face of user 210. While worn, respirator 220 may obstruct, press against a mouth and nose (not depicted) of user 210.

Respirator 220 may also include one or more components configured to perform RAA consistent with some embodiments of the present disclosure. Specifically, respirator 220 may include one or more of the following: at least one microphone 224; internal air sensor 226-1, external air sensor 226-2, a vibration sensor 226-3 (collectively sensors 226), and a network transceiver 228. Respirator 220 may also operate based on a power source (not depicted) such as one or more of a battery, supercapacitor, mainspring, linear generator, or other relevant power source. Microphone 224 may be an auditory or acoustic transceiver configured to receive acoustic signals from user 210. Microphone 224 may be located on an inside or user-facing surface of the respirator 220. Microphone 224 may be communicatively coupled to a network transceiver 228 such that speech, noises, sounds, utterances, and other acoustic information is transmitted to network transceiver 228.

Sensors 226 may include airs sensors 226-1 and 226-2, and also vibration sensor 226-3. In some embodiments, respirator 220 may include a plurality of internal air sensors (e.g., three, seven, ten), a plurality of external air sensors (e.g., two, seven), and a plurality of vibration sensors. In some embodiments, respirator 220 may only include a single air sensor. In some embodiments, respirator 220 may include only a single vibration sensor. Respirator 220 may be configured with two air sensors 226-1 and 226-2 and a single vibration sensor 226-3, for illustrative purposes. Sensors 226 may be permanently or removably affixed, couple, or attached to respirator 220. For example, sensor 226-1 may be sewn into or inside a multiple layer respirator 220 at the time of manufacture. In another example, sensor 226-3 may be glued to one or more surface fibers, or attached with a string or cord to respirator 220. In yet another example, sensor 226-2 may be temporarily connected to the outside of respirator 220 with a hook-and-loop style attachment system. In some instances, sensor 226-2 may be removed and functionality of sensor 226-2 may be retained. For example, system 200 may operate by receiving readings of non-verbal acoustic information from sensors 226-1 and 226-3 without attachment or presence of sensor 226-2. This may be preferrable where a user 210 may prefer to wear respirator 220 but may not prefer for any sensors or operations of system 200 to be outwardly visible to other users.

Air sensors 226-1 and 226-2 may be configured as air flow sensors and may derive one or more measurements or readings regarding the flow rate of air adjacent to the respirator 220. Air sensors 226-1 and 226-2 may be configured as air speed sensors and may derive one or more readings measurements or readings regarding the air pressure of air adjacent to the respirator 220. Air sensors 226-1 and 226-2 may be configured as bidirectional sensors. For example, air sensors 226-1 and 226-2 may be configured to measure the direction and force of air directed towards and air directed away from respirator 220. Air sensor 226-1 may be configured as an internal air sensor 226-1. Specifically, air sensor 226-1 may measure the pressure, speed, volume, or other relevant information regarding air produced on an internal surface of the respirator 220. For example, as a user speaks or utters words or phrases, internal air sensor 226-1 may be configured to provide the readings to network transceiver 228. The readings may include the volume at which air is flowing from the mouth or nose of the user 210. The readings may include the direction at which air is flowing on the internal surface, such as whether the user 210 is inhaling, exhaling, or generating a relatively still air. Similarly, air sensor 226-2 may be configured as an external air sensor 226-2. Air sensor 226-2 may be constructed and configured similar to sensor to sensor 226-1 and may monitor and capture the same range of measurements and readings as sensor 226-1.

The vibration sensor 226-3 may be one or more sensors coupled to the respirator 220. In some embodiments, vibration sensor 226 may be coupled to another part of the user 210, such as near the neck or throat (not depicted). In some embodiments, vibration sensor 226 may be coupled to or affixed to the straps 222. Vibration sensor 226 may be a sensor configured to react to a mechanical strain or force that is applied (e.g., a piezoresistive sensor). Vibration sensor 226 may be a sensor configured to measure one or more non-verbal acoustic readings of a user 210 as the user is speaking while wearing respirator 220. For example, vibration sensor 226 may be affixed at a location near the skin, lips, throat, chin cheeks, or other part of a user 210 may press, vibrate, or otherwise move during speech.

Headphone 230 may be configured to provide sounds to user 210. Specifically, headphone 230 may include a speaker 232 configured to receive sounds from respirator 220 and/or electronic device 240 and play back the received sounds to user 210. Headphone 230 may be a headset configured to receive sounds from user 210 as the user speaks and/or creates verbal acoustics. Specifically, headphone 230 may include a microphone 234 that is configured received sound as the user speaks and/or creates verbal acoustics.

The electronic device 240 may be a computing device configured to run one or more programs in software, hardware, firmware, or some combination. Electronic device 240 may be a client device in a form factor such as a desktop computer, laptop computer, smartphone, tablet computer, or other computing device (e.g., computer 100). Electronic device 240 may include a microphone 242, a speaker 244, and a display 246. Electronic device 240 may communicate with respirator 220 and headphone 230 by internal network 250. Internal network 250 may be a personal area network using a relevant wired or wireless protocol (e.g., Bluetooth, IEEE 802.15). Internal network 250 may be a local area network using a relevant wired or wireless protocol (e.g., Wi-Fi™, IEEE 802.3, IEEE 802.11). The electronic device 240 may provide feedback regarding operations to user 210 as output. For example, electronic device 240 may prompt user 210 through speaker 244 or display 246. The prompt may include a request for the user to speak or recite certain text or phrases and may include displaying the text through display 246. The electronic device 240 may also be configured to receive input from a user, such as speech through microphone 242. The electronic device 240 may also be communicatively coupled to external network 260

The electronic device 240 may perform RAA 270. Specifically, RAA 270 may include one or more particular software, hardware, or firmware programs operating on a processor (not depicted) of electronic device 240. The RAA 270 may include receiving from microphone 234, or 242 one or more verbal utterances and other acoustic information from the user 210. This may be performed as part of a training operation. For instance, RAA 270 may be configured to generate and update an acoustic adjustment model ("model") 280 that includes a profile of the user 210. The model 280 may include snippets, vowels, and other language samples of the user 210 speaking and verbalizing various words. In one example, a user 210 may be prompted by RAA 270, through a visual cue rendered to display 246. The user 210 may be requested to speak or say certain words or text that are rendered. The user 210 may speak the text and the RAA 270 may update the model based on the unobstructed or un-muffled words and speech. The model 280 may also take into account the respirator 220. For example, the respirator 220 may be made by a particular manufacturer, and an identifier may be transmitted to RAA 270 by way of the transceiver 228 through internal network 250. Responsively, RAA 270 may instruct electronic device 240 to retrieve one or more specifications of respirator 220 through external network 260 (e.g., retrieve from a manufacturer database through the Internet). The RAA 270 may utilize one or more retrieved specifications of respirator 220 to generate one or more features or inputs of model 280.

In some embodiments, RAA 270 may execute machine learning to generate model 280 using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, RAA 270 may perform natural language processing to further develop model 280. Natural language processing may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of verbal utterances and acoustic sounds or other content from respirator 220. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., such as previously obtained voice samples of user 210 while wearing the respirator 220, previously obtained voice samples of user 210 while wearing other respirators, previously obtained voice samples of user 210 without wearing any respirator). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a vocal sample from user 210 through respirator 220, microphone 234, and/or microphone 242 at the natural language processing, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

The RAA 270 may generate an adjusted verbal utterance 290 for output. For example, RAA 270 may leverage model 280 as well as the utterances of the user captured by microphone 224 and sensors 226 of respirator 220 as input. In one example, the RAA 270 may receive sensor readings from sensors 226. The placement of sensors 226-1 and 226-2 may allow for determinations regarding non-verbal acoustic information that is generated by user 210. The RAA 270 may be configured to compare and determine a change in a specific pressure or volume of air inside of the respirator 220 (e.g., increased pressure on the face of user 210 at certain parts of speech or in coordination with words spoken through microphone 224, a reduced flow of air at sensor 226-2 in comparison to sensor 226-1 in combination with verbal recording captures by microphones 224, 234, and 242). The RAA 270 may determine a verbal distortion factor of user 210 as the user is speaking. The verbal distortion factor may take into account the distortions, manipulations, changes, or other alterations of the user 210 due to the user wearing respirator 220. For example, the verbal distortion factor may be a lowering in volume, a reduction in enunciation, or other change to the speech of user 210. The adjusted verbal utterance 290 may be provided as output to the user 210 or to others. For example, the adjusted verbal utterance may be provided to speaker 232 or speaker 244, or through external network 260 to another user as part of a phone call. The adjusted verbal utterance 290 may be a machine-generated or machine-manipulated form of speech. Specifically, the adjusted verbal utterance 290 may emulate or reproduce a verbal utterance that is unmodified or sounds like a verbal utterance of the user 210 without wearing a respirator.

Figure 3:
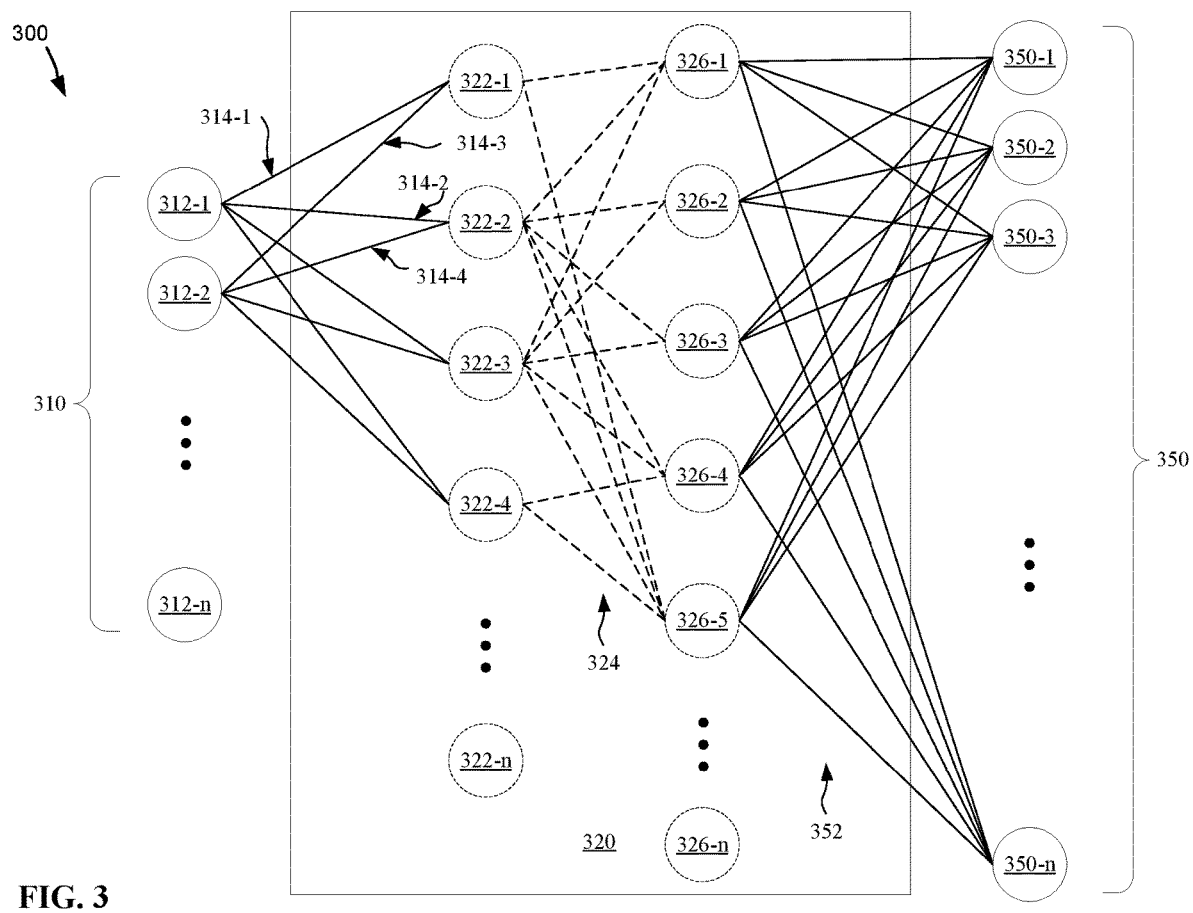
FIG. 3 depicts an example network representative of one or more artificial neural networks capable of generating an altered verbal utterance consistent with embodiments of the present disclosure.

FIG. 3 depicts an example network 300 representative of one or more artificial neural networks capable of generating an altered verbal utterance consistent with embodiments of the present disclosure. Example network 300 may be a part of a model that is configured to operate on an electronic device and analyze acoustic signals for an RAA, such as model 280. The model neural network (neural network) 300 is made up of a plurality of layers. The neural network 300 includes an input layer 310, a hidden section 320, and an output layer 350. Though example network 300 depicts a feed-forward neural network, it should be appreciated that other neural networks layouts may also be configured to generate an altered verbal utterance such as a recurrent neural network layout (not depicted). In some embodiments, the neural network 300 may be a design-and-run neural network and the layout depicted by the model may be created by a computer programmer. In some embodiments, the neural network 300 may be a design-by-run neural network, and the layout depicted may be generated by the input of data and by the process of analyzing that data according to one or more defined heuristics. The neural network00 may operate in a forward propagation by receiving an input and outputting a result of the input. The neural network00 may adjust the values of various components of the neural network by a backward propagation (back propagation).

The input layer 310 includes a series of input neurons 312-1, 312-2, up to 312-$n$ (collectively, 312) and a series of input connections 314-1, 314-2, 314-3, 314-4, etc. (collectively, 314). The input layer 310 represents the input from data that the neural network is supposed to analyze (e.g., sensor signals, verbal utterance, audio recordings, non-verbal data such as information regarding the type of respirator a user is wearing or the age of the user). Each input neuron 312 may represent a subset of the input data. For example, the neural network 300 is provided with a verb or noun from a sound file or recording of a user as input, and the verb or noun is represented by various numbers of the input neurons 312.

In another example, input neuron 312-1 may be the first pixel of a picture, input neuron 312-2 may be the second pixel of the picture, etc. The number of input neurons 312 may correspond to the size of the input. For example when the neural network is designed to analyze images that are 256 pixels by 256 pixels, the neural network 300 layout may include a series of 65,536 input neurons. The number of input neurons 312 may correspond to the type of input. For example when the input is a color image that is 256 pixels by 256 pixels, the neural network 300 layout may include a series of 196,608 input neurons (65,536 input neurons for the red values of each pixel, 65,536 input neurons for the green values of each pixel, and 65,536 input neurons for the blue values of each pixel). The type of input neurons 312 may correspond to the type of input. In a first example, the neural network 300 may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, the neural network 300 may be designed to analyze images that are color, and each of the input neurons may be a three dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 314 represent the output of the input neurons 312 to the hidden section 320. Each of the input connections 314 varies depending on the value of each input neuron 312 and based upon a plurality of weights (not depicted). For example, the first input connection 314-1 has a value that is provided to the hidden section 320 based on the input neuron 312-1 and a first weight. Continuing the example, the second input connection 314-2 has a value that is provided to the hidden section 320 based on the input neuron 312-1 and a second weight. Further continuing the example, the third input connection 314-3 based on the input neuron 312-2 and a third weight, etc. Alternatively stated, the input connections 314-1 and 314-2 share the same output component of input neuron 312-1 and the input connections 314-3 and 314-4 share the same output component of input neuron 312-2; all four input connections 314-1, 314-2, 314-3, and 314-4 may have output components of four different weights. Though the neural network 300 may have different weightings for each connection 314, some embodiments may contemplate weights that are similar. In some embodiments, each of the values of the input neurons 312 and the connections 314 may necessarily be stored in memory.

The hidden section 320 includes one or more layers that receive inputs and produce outputs. The hidden section 120 includes a first hidden layer of calculation neurons 322-1, 322-2, 322-3, 322-4, up to 322-n (collectively, 322); a second hidden layer of calculation neurons 326-1, 326-2, 326-3, 326-4, 326-5, up to 326-n (collectively 326); and a series of hidden connections 324 coupling the first hidden layer and the second hidden layer. It should be appreciated that example network 300 only depicts one of many neural networks capable of performing RAA consistent with some embodiments of the disclosure. Consequently, the hidden section 320 may be configured with more or less hidden layers (e.g., one hidden layer, seven hidden layers, twelve hidden layers, etc.)—two hidden layers are depicted for example purposes.

The first hidden layer 322 includes the calculation neurons 322-1, 322-2, 322-3, 322-4, up to 322-n. Each calculation neuron of the first hidden layer 322 may receive as input one or more of the connections 314. For example, calculation neuron 322-1 receives input connection 314-1 and input connection 314-2. Each calculation neuron of the first hidden layer 322 also provides an output. The output is represented by the dotted lines of hidden connections 324 flowing out of the first hidden layer 322. Each of the calculation neurons 322 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 322 also contains a bias (not depicted). The bias may be used to decide the likelihood or valuation of a given activation function. In some embodiments, each of the values of the biases for each of the calculation neurons must necessarily be stored in memory.

An example of example network 300 may include the use of a sigmoid neuron for the activation function of calculation neuron 322-1. An equation (Equation 1, stated below) may represent the activation function of calculation neuron 312-1 as f(neuron). The logic of calculation neuron 322-1 may be the summation of each of the input connections that feed into calculation neuron 322-1 (i.e., input connection 314-1 and input connection 314-3) which are represented in Equation 1 as j. For each j the weight w is multiplied by the value x of the given connected input neuron 312. The bias of the calculation neuron 322-1 is represented as b. Once each input connection j is summed the bias b is subtracted. Finalizing the operations of this example as follows: given a larger positive number of results from the summation and bias in activation f(neuron), the output of calculation neuron 322-1 approaches approximately 1; given a larger negative number of results from the summation and bias in activation f(neuron), the output of calculation neuron 322-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp(-\Sigma_j w_j x_j - b)} \qquad \text{Equation 1}$$

The second hidden layer 326 includes the calculation neurons 326-1, 326-2, 326-3, 326-4, 326-5, up to 326-n. In some embodiments, the calculation neurons of the second hidden layer 326 may operate similarly to the calculation neurons first hidden layer 322. For example, the calculation neurons 326-1 to 326-n may each operate with a similar activation function as the calculation neurons 322-1 to 322-n. In some embodiments, the calculation neurons of the second hidden layer 326 may operate differently to the calculation neurons of the first hidden layer 322. For example, the calculation neurons 326-1 to 326-n may have a first activation function, and the calculation neurons 322-1 to 322-n may have a second activation function.

Similarly, the connectivity to, from, and between the various layers of the hidden section 320 may also vary. For example, the input connections 314 may be fully connected to the first hidden layer 322 and hidden connections 324 may be fully connected from the first hidden layer to the second hidden layer 326. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 314 may not be fully connected to the first hidden layer 322 and the hidden connections 324 may not be fully connected from the first hidden layer to the second hidden layer 326.

Further, the parameters to, from, and between the various layers of the hidden section 320 may also vary. In some embodiments, the parameters may include the weights and the biases. In some embodiments, there may be more or less parameters than the weights and biases. For example, the example network 300 may be of a convolutional network. The convolutional neural network may include a sequence of heterogeneous layers (e.g., an input layer 310, a convolution layer 322, a pooling layer 326, and an output layer 350). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 350 includes a series of output neurons 350-1, 350-2, 350-3, up-to 350-n (collectively, 350). The output layer 350 holds a result of the analyzation of the neural network 300. In some embodiments, the output layer 350 may be a categorization layer used to identify a feature of the input to the neural network 300. For example, the neural network 300 may be a classification network trained to identify Arabic numerals. In such an example, the neural network 300 may include ten output neurons 350 corresponding to which Arabic numeral the network has identified (e.g., output neuron 350-2 having a higher activation value than output neurons 350 may indicate the neural network determined an image contained the number '1'). In some embodiments, the output layer 350 may be a real-value target (e.g., trying to predict a result when an input is a previous set of results) and there may be only a singular output neuron (not depicted). The output layer 350 is fed from an output connection 352. The output connection 352 provides the activations from the hidden section 320. In some embodiments, the output connections 352 may include weights and the output neurons 350 may include biases.

Training the neural network depicted by the example network 300 may include performing back propagation. Back propagation is different from forward propagation. Forward propagation may include feeding of data into the input neurons 310; performing the calculations of the connections 314, 324, 352; and performing the calculations of the calculation neurons 322 and 326. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the neural network 300 by starting with the output neurons 350 and propagating the error backward through the various connections 352, 324, 314 and layers 326, 322, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

For example, neural network 300 may be a classification network; may be provided with a sample input audio file that contains the samples of speech from a user that includes a name of a restaurant; and may determine that the name is most likely the name of a person and is second most likely the name of a location and is third most likely not a name (and so on with the other words and acoustic information from the speech). Continuing the example, performing a back propagation may alter the values of the weights of connections 314, 324, and 352; and may alter the values of the biases of the first layer of calculation neurons 322, the second layer of calculation neurons 326, and the output neurons 350. Further continuing the example, the performance of the back propagation may yield a future result that is a more accurate classification of the same samples of speech from the user input that contains the name of the restaurant (e.g., more closely ranking name of place, name of person, then not a name in order of most likely to least likely, etc.).

Equation 2 provides an example of the objective function in the form of a quadratic cost function (e.g., mean squared error)—other functions may be selected, and the mean squared error is selected for example purposes. In Equation 2, all of the weights may be represented by w and biases may be represented by b of an example network. The example network is provided a given number of training inputs n in a subset (or entirety) of training data that have input values x. The example network may yield output a from x and should yield a desired output y(x) from x. Back propagation or training of the example network should be a reduction or minimization of the objective function 'O(w,b)' via alteration of the set of weights and biases. Successful training of the example network should not only include the reduction of the difference between the example network's answer a and the correct answers y(x) for the input values x, but given new input values (e.g., from additional training data, from validation data, etc.).

$$O(w, b) \equiv \frac{1}{2n}\Sigma_x \|y(x) - a\|^2 \quad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 300 may be small in any given iteration. Back propagation algorithms may need to be repeated for many iterations to perform accurate learning as a result of the necessitated smallness of any given iteration.

For example, neural network 300 may have untrained weights and biases, and back propagation may involve the stochastic gradient descent to train the network over a subset of training inputs (e.g., a batch of 10 training inputs from the entirety of the training inputs). Continuing the example, neural network 300 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, neural network 300 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 4:
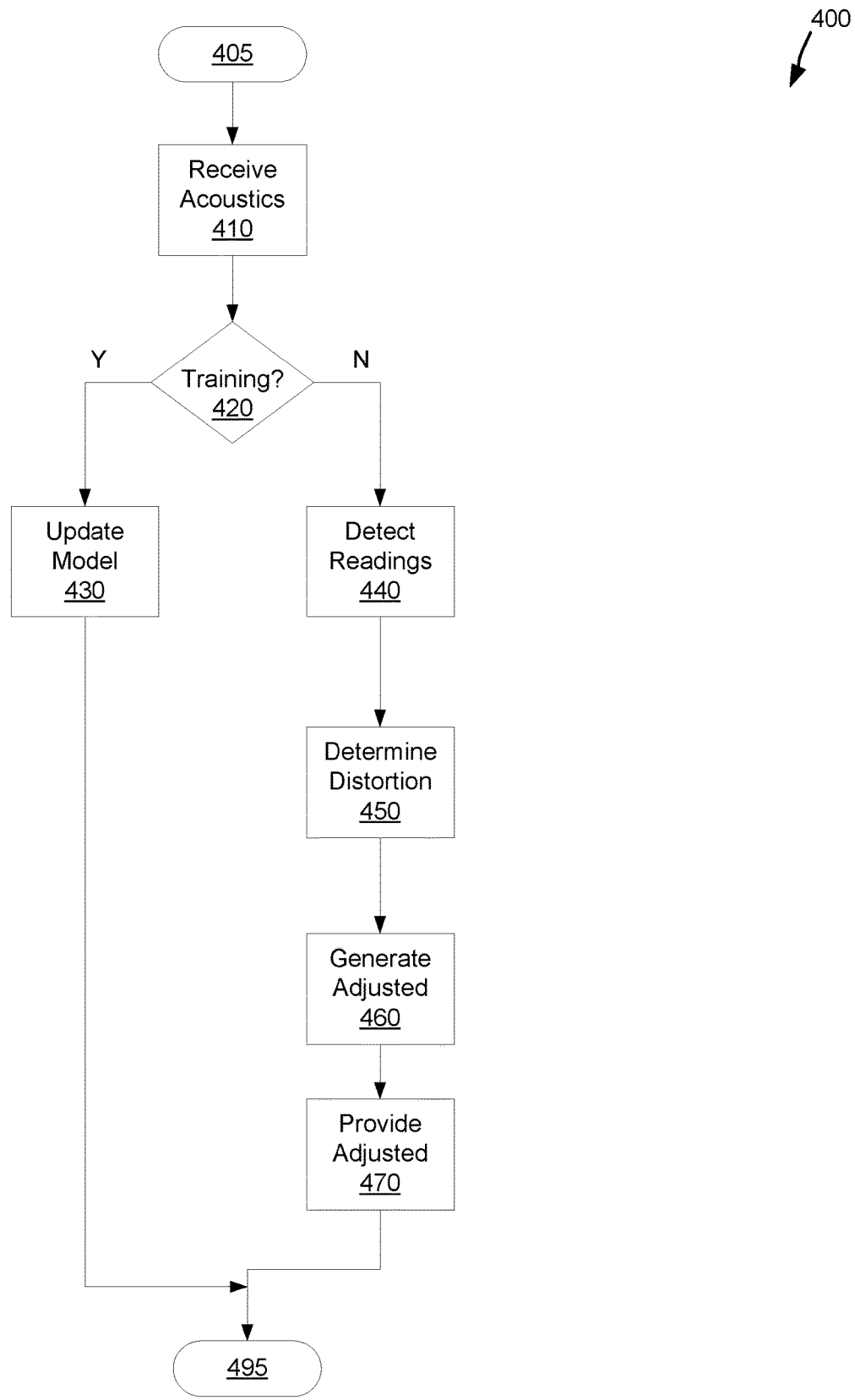
FIG. 4 is an example method of performing adjustments to verbal utterances of users, consistent with some embodiments of the disclosure.

FIG. 4 is an example method 400 of performing adjustments to verbal utterances of users, consistent with some embodiments of the disclosure. Method 400 may be performed by a computer system, such as computer 100. Method 400 may be performed by a respirator, an electronic device, or a combination. For example, certain operations of method 400 may be performed by respirator 220 while other operations may be performed by electronic device 240. Method 400 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

At 405 method 400 begins, when one or more acoustic signals are received at 410. The one or more acoustic signals may include non-verbal sound such as the movement of air and vibration of vocal chords. The received verbal acoustics may include verbal utterances from a user, such as words, phrases, phonetics, or other parts of speech. The acoustic signals may be received by an electronic device and may be provided by a respirator (e.g., such as electronic device 240 receiving sound from respirator 220).

If the electronic device is operating in a training mode at 420:Y, the received acoustic information may be used to update a model at 430. Updating of the model may include inputting non-verbal information from the sensor readings, such as acoustic information received from the respirator. Updating of the model may include inputting verbal information such as detected or determined words or phrases based on performing natural language processing on the data. After updating the model at 430, method 400 may end at 495.

If the electronic device is not operating in a training mode at 420:N, one or more non-verbal sensor readings may be detected at 440. The one or more non-verbal sensor readings may be detected from a respirator. For example, concurrent with being worn by a user, one or more non-verbal sensors such as airflow sensors, air pressure sensors, vibration sensors, or other relevant non-verbal sensors may be measuring various sounds, air movements, and vibrations of a user.

Responsive to detecting the non-verbal sensor readings, a distortion factor may be determined at 450. The distortion factor may be a verbal distortion factor. The distortion factor may be the amount of volume, pitch, vibration, movement, or other relevant distortion of a user that wears the respirator. The determination may be made by inputting the non-verbal information to an acoustic adjustment model, such as a model 280. The acoustic adjustment model may be a ML model that is generated based on prior utterances of the user, prior utterances of other users, prior utterances of unmasked and masked users speaking, and/or some combination.

An adjusted verbal distortion factor may be generated at 460. The adjusted verbal distortion factor may be generated by applying the verbal distortion factor to the verbal utterance received at 410. The application may include stretching, melding, combining, multiplying, adding, offsetting, or otherwise adjusting the received acoustic signal that includes the verbal utterance. The generating may result in a machine-created acoustic file that simulates or emulates the speech of a user without the user wearing the respirator.

The adjusted verbal utterance may be provided to a voice output at 470. The voice output may be an output just for the user. For example, the output may be a headphone or headset communicatively coupled to the electronic device. The adjusted verbal utterance may be played back to the headphone of the user after being received from the electronic device. The voice output may be an output for other users, such as through a telephone call that is concurrently occurring by way of the electronic device. The voice output may be an output to an application, such as a text-to-speech application that is executing on a computer, such as electronic device 240. After the adjusted verbal utterance is output, method 400 may end at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving an acoustic signal from a first user, wherein the acoustic signal of the first user includes a verbal utterance related to the first user;
    detecting, from a set of one or more sensors of a wearable device, a set of one or more non-verbal sensor readings, wherein the wearable device is worn by the user concurrent with the verbal utterance;
    determining, based on an acoustic adjustment model and in response to the set of non-verbal sensor readings, a verbal distortion factor;
    generating, from the verbal utterance and based on the verbal distortion factor, an adjusted verbal utterance related to the first user; and
    providing, the adjusted verbal utterance, to a voice output.

2. The method of claim 1, wherein the acoustic adjustment model includes a machine learning model, and wherein the determining the verbal distortion factor comprises:
    inputting, to the machine learning model, the non-verbal sensor readings.

3. The method of claim 2, the determining the verbal distortion factor comprises:
    inputting, to the machine learning model, the verbal utterance.

4. The method of claim 2, wherein the method further comprises:
    updating the machine learning model based on prior verbal utterances of the first user.

5. The method of claim 2, wherein the method further comprises:
updating the machine learning model based on prior verbal utterances of users other than the first user.

6. The method of claim 2, wherein the machine learning model is trained based on the wearable device.

7. The method of claim 1, wherein the wearable device is a respirator configured to filter an atmosphere around the user.

8. The method of claim 7, wherein a first sensor of the one or more sensors is an air speed sensor coupled to an inside surface of the respirator.

9. The method of claim 8, wherein a second sensor of the one or more sensors is an air speed sensor coupled to an outside surface of the respirator.

10. The method of claim 7, wherein a first sensors of the one or more sensors is a vibration sensor.

11. The method of claim 1, wherein the voice output is a transceiver of a client device.

12. The method of claim 1, wherein the voice output is a network communication to a second user.

13. The method of claim 1, wherein the voice output is a headphone communicatively coupled to a client device of the user.

14. The method of claim 1, wherein the verbal utterance is received from a microphone, and wherein the receiving the acoustic signal comprises:
transmitting, by the microphone, the acoustic signal to a client device of the user.

15. A system, the system comprising:
a memory, the memory containing one or more instructions; and
a processor, the processor communicatively coupled to the memory, the processor, in response to reading the one or more instructions, configured to:
receive an acoustic signal from a first user, wherein the acoustic signal of the first user includes a verbal utterance related to the first user;
detect, from a set of one or more sensors of a wearable device, a set of one or more non-verbal sensor readings, wherein the wearable device is worn by the user concurrent with the verbal utterance;
determine, based on an acoustic adjustment model and in response to the set of non-verbal sensor readings, a verbal distortion factor;
generate, from the verbal utterance and based on the verbal distortion factor, an adjusted verbal utterance related to the first user; and
provide, the adjusted verbal utterance, to a voice output.

16. The system of claim 15, wherein the acoustic adjustment model includes a machine learning model, and wherein the determine the verbal distortion factor comprises:
inputting, to the machine learning model, the non-verbal sensor readings.

17. The system of claim 15, wherein the wearable device is a respirator configured to filter an atmosphere around the user.

18. A computer program product, the computer program product comprising:
one or more computer readable storage media; and
program instructions collectively stored on the one or more computer readable storage media, the program instructions configured to:
receive an acoustic signal from a first user, wherein the acoustic signal of the first user includes a verbal utterance related to the first user;
detect, from a set of one or more sensors of a wearable device, a set of one or more non-verbal sensor readings, wherein the wearable device is worn by the user concurrent with the verbal utterance;
determine, based on an acoustic adjustment model and in response to the set of non-verbal sensor readings, a verbal distortion factor;
generate, from the verbal utterance and based on the verbal distortion factor, an adjusted verbal utterance related to the first user; and
provide, the adjusted verbal utterance, to a voice output.

19. The computer program product of claim 18, wherein the acoustic adjustment model includes a machine learning model, and wherein the determine the verbal distortion factor comprises:
inputting, to the machine learning model, the non-verbal sensor readings.

20. The computer program product of claim 18, wherein the wearable device is a respirator configured to filter an atmosphere around the user.

* * * * *